United States Patent
Tseng et al.

(10) Patent No.: US 10,343,633 B2
(45) Date of Patent: Jul. 9, 2019

(54) METHOD AND APPARATUS FOR PREDICTIVE VEHICLE PRECONDITIONING

(71) Applicant: Ford Global Technologies, LLC, Dearborn, MI (US)

(72) Inventors: Fling Tseng, Ann Arbor, MI (US); Hsin-hsiang Yang, Ann Arbor, MI (US); Aed M. Dudar, Canton, MI (US); Dimitar Petrov Filev, Novi, MI (US); Johannes Geir Kristinsson, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 515 days.

(21) Appl. No.: 14/627,656

(22) Filed: Feb. 20, 2015

(65) Prior Publication Data
US 2016/0244010 A1    Aug. 25, 2016

(51) Int. Cl.
*B60R 16/037* (2006.01)
*B60H 1/00* (2006.01)

(52) U.S. Cl.
CPC ....... *B60R 16/037* (2013.01); *B60H 1/00742* (2013.01); *B60H 1/00778* (2013.01)

(58) Field of Classification Search
CPC ........... B60R 2325/205; B60R 16/037; B60W 10/30; B60W 2510/0676; F02D 41/062; B60L 2240/445; F02N 11/08; F02N 11/0807; B60H 1/00778; B60H 1/00742

USPC ...................................................... 701/36–37
See application file for complete search history.

(56) References Cited

U.S. PATENT DOCUMENTS

| | | | |
|---|---|---|---|
| 2006/0080007 A1* | 4/2006 | Gerard | F02N 11/0811 701/2 |
| 2010/0235046 A1 | 9/2010 | Proefke et al. | |
| 2013/0079978 A1 | 3/2013 | Uyeki | |
| 2016/0075272 A1* | 3/2016 | Cermak | B60Q 1/00 340/426.15 |

OTHER PUBLICATIONS

BMW Group, PressClub USA, BMW Launches First App to Automate the Home Charging Process for BMW i Electric Vehicles, Sep. 6, 2014.
Sam Abuelsamid, Trending, Tailgate Up or Down? Land Cruiser 70 2015 Volvo XC90 Ford GTR1 WRX S4 Revealed, GM and OnStar launch sophisticated mobile app for Volt [w/videos], Jan. 5, 2010.

* cited by examiner

*Primary Examiner* — Nga X Nguyen
(74) *Attorney, Agent, or Firm* — Frank Lollo; Brooks Kushman P.C.

(57) ABSTRACT

A system includes a processor configured to access a schedule of vehicle start times. The processor is also configured to select a scheduled key-on time, when a current time is within a tunable proximity to the scheduled key-on time. Further, the processor is configured to determine if a present vehicle-related temperature warrants vehicle preconditioning and precondition the vehicle until preset preconditioning settings are established.

9 Claims, 5 Drawing Sheets

METHOD AND APPARATUS FOR PREDICTIVE VEHICLE PRECONDITIONING

TECHNICAL FIELD

The illustrative embodiments generally relate to a method and apparatus for predictive vehicle preconditioning.

BACKGROUND

Driver experience is very important to automotive original equipment manufacturers (OEM)s. The experience a driver has with a vehicle can drive future sales, positive word-of-mouth, and generally promote the reputation of the OEM. Accordingly, OEMs are constantly on the lookout for ways to improve the in-vehicle experience.

Because vehicles are purchased for use in a variety of climates, different choices may be made by different drivers based on an initial comfort level when a vehicle is entered. That is, in a hot climate with lots of sun, drivers may avoid dark seats that can heat up easily. In a cold climate, leather seats may be avoided, as it tends to feel colder than fabric upon initial contact.

Many of these selections, and much initial discomfort, could be mitigated or alleviated if the vehicle was made comfortable before the driver ever entered the vehicle. Additionally, if the vehicle could warm up or cool down in advance of use, battery efficiency might be improved as well.

SUMMARY

In a first illustrative embodiment, a system includes a processor configured to access a schedule of vehicle start times. The processor is also configured to select a scheduled key-on time, when a current time is within a tunable proximity to the scheduled key-on time. Further, the processor is configured to determine if a present vehicle-related temperature warrants vehicle preconditioning and precondition the vehicle until preset preconditioning settings are established.

In a second illustrative embodiment, a computer-implemented method includes analyzing a time interval to determine whether a key-on event occurred. The method also includes updating a record of key-on events with the occurrence/non-occurrence of a key-on event to establish a likelihood of key-on during the time interval. The method further includes assembling a schedule of a plurality of predicted key-on time intervals based on predicted likelihood of key-on during each of the plurality of predicted key-on time intervals and notifying a driver of any determined deviances between the assembled schedule and a driver-input schedule of scheduled key-on events.

In a third illustrative embodiment, a non-transitory computer-readable storage medium stores instructions that, when executed, cause a processor to perform a method including analyzing a time interval to determine whether a key-on event occurred. The method also includes updating a record of key-on events with the occurrence/non-occurrence of a key-on event to establish a likelihood of key-on during the time interval. Further, the method includes assembling a schedule of a plurality of predicted key-on time intervals based on predicted likelihood of key-on during each of the plurality of predicted key-on time intervals and notifying a driver of any determined deviances between the assembled schedule and a driver-input schedule of scheduled key-on events.

BRIEF DESCRIPTION OF THE DRAWINGS

FIG. 4 shows an illustrative process for predicting upcoming key-on;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
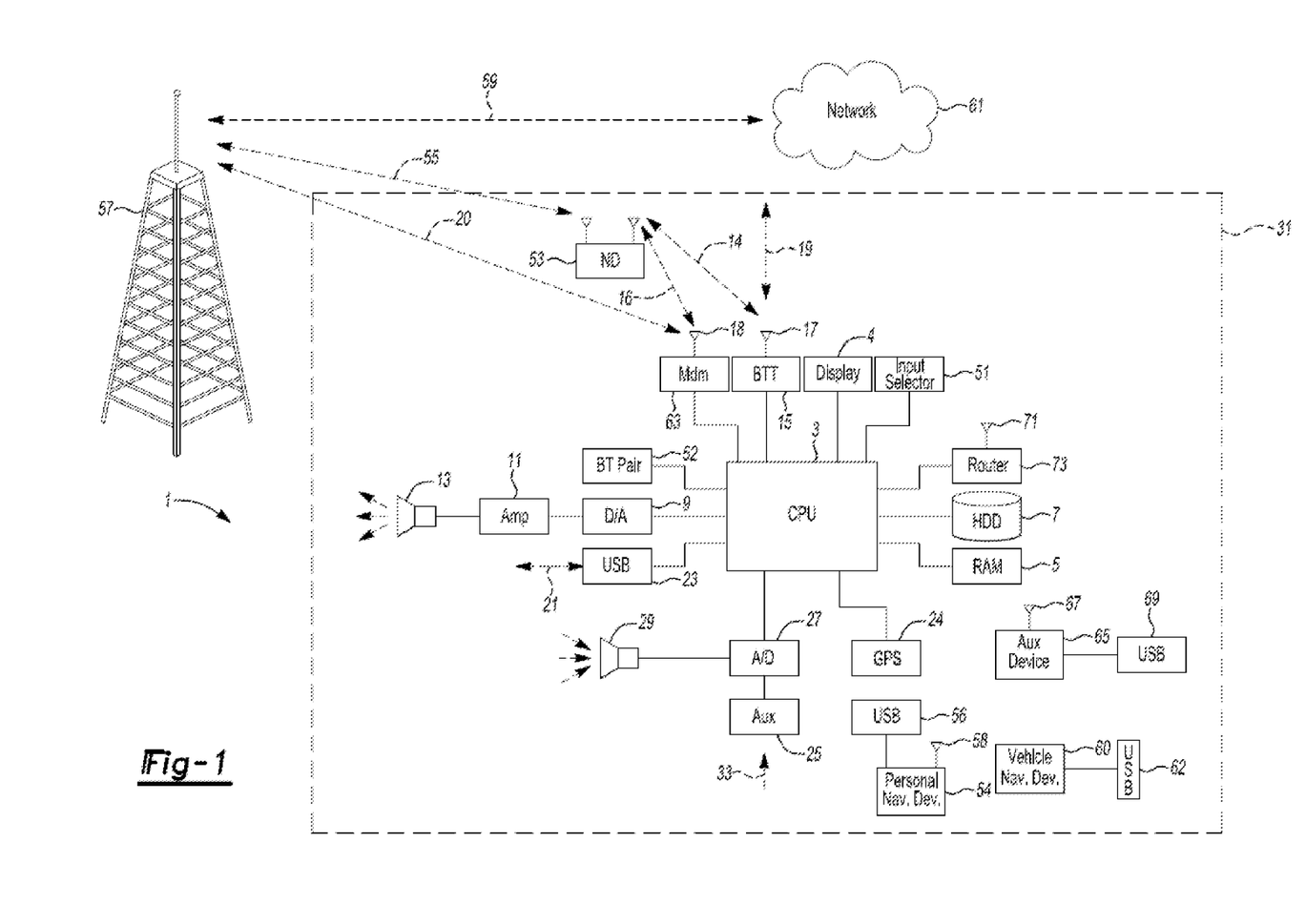
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent storage 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Modern vehicles come equipped with telematics systems that allow communication between the vehicle and remote systems. Some examples of this communication capability are shown with respect to FIG. 1 above. Other types of remote communication are also constantly being added to telematics systems. As systems become more capable of cross-communication, for example, it is possible for home systems to talk to vehicle systems to promote further sharing of information.

In the illustrative examples, a user may have a calendar or other schedule indicia that represents planned start times for vehicle usage. For example, if a user goes to work at seven AM, Monday through Friday, and leaves work at six PM, then the calendar might indicate these times. Other times might include, for example, driving a child to appointments, school, etc. Any commonly recurring events may be logged in the calendar, as well as one-off events that only occur once or twice.

This calendar could be filled out on a mobile application or on a website, and the information reflected in the calendar could be accessed by the vehicle (remotely or transferred to the vehicle). This information could be used as one basis for determining when a likely vehicle start was going to occur.

In other examples, a user may not want to fill out a calendar, or know to fill out a calendar. In such instances, the vehicle may attempt to predict whether or not a user will utilize the vehicle based on predicted start times derived from observed behavior. The vehicle can build a model of user behavior over time, based on observed behavior, and thus can predict with some degree of success whether or not a user will engage in vehicle use.

Once the process knows (from a calendar or based on observed behavior) whether or not a vehicle will be used, the process can then engage in pre-conditioning of the vehicle. This could be as simple as setting the vehicle interior to a desired temperature, or could include warming up/cooling the battery, warming/cooling seats, cracking windows, defrosting a windshield, etc. This can improve both the user experience and, with respect to the battery, can help improve battery efficiency and charge utilization.

Figure 2:
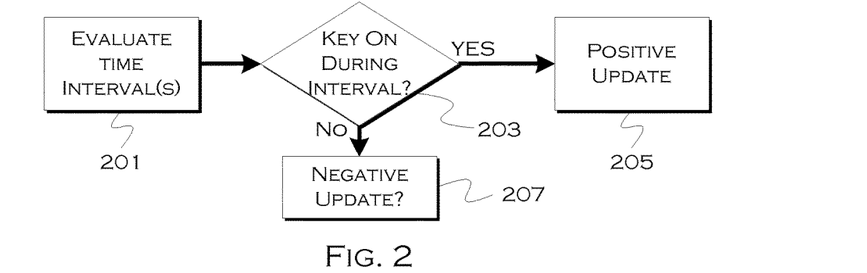
FIG. 2 shows an illustrative example of key-on timing learing.

FIG. 2 shows an illustrative example of key-on timing leafing. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative, simplistic example shown in FIG. 2, the vehicle or a vehicle-related system (e.g., mobile device that communicates with the vehicle, remote server, etc.) evaluates a single or series of time interval(s) 201. For example, without limitation, this evaluation could be done each day at some fixed time, or when computing power was available, etc. The process could also be on-going and updated as the day progresses.

For a given time interval, the process determines whether or not a vehicle was keyed-on during the interval 203. In this example, a day is broken into a series of time intervals, and any key-on during the time interval "adds" to the likelihood of future key-ons during that time interval. Because it would take a long time to learn a single users behavior pattern for exact times, and because people generally leave at an approximate time (i.e., a 7 AM departure may be 6:58 AM one day and 7:02 AM the next), it may be more accurate and convenient to determine projected departure times based on time windows. Also, likelihood values for a given time period can be reduced by tracking information indicating that no key-on was processed.

For each interval, if the vehicle was keyed-on, a positive update (indicating increased future likelihood of key-on) is provided 205. If the vehicle was not keyed-on, a negative update (indicating a decreased likelihood of key-on at that time) is provided 207. While this is a fairly simple model, it demonstrates one way in which the likelihood of departure during a given time window can be determined and modified. At the same time that the key-on interval is positively updated, other intervals between the present key-on interval and a last key-on interval may have a negative update, indicating no key-on during those intervals.

Figure 3:
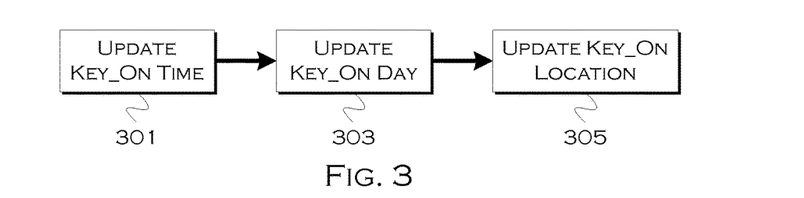
FIG. 3 shows an illustrative data update for key-on timing.

FIG. 3 shows an illustrative data update for key-on timing. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

This example shows an update that could be utilized for a positive or negative update in conjunction with a learning process such as exemplified in FIG. 2. In this example, the process would update (positively or negatively) a key-on time interval 301. So, for example, if a vehicle was started at 7:07 AM, the 7:00-7:15 AM time interval may be positively updated. At the same time, a day of week may be positively or negatively updated. In addition to knowing common start times, human behavior is often based on a schedule, which is reflected in common actions on similar days of the week in different weeks. Thus, it may be useful to know not only what time the vehicle was started, but what day the vehicle was started. Thus, for a person heading to work at 7 AM from Monday-Friday, but not using a vehicle until noon to go to the gym on Saturday and at 10:30 AM for church on Sunday, predictions of a 7 AM start would not be used on Saturday or Sunday, and the noon and 10:30 predictions would develop for Saturday and Sunday respectively. Accordingly, a day of week update 303 could be processed.

Also, in this example, a key-on location can be updated 305. In some instances, a key-on time may relate to a vehicle location. For example, if a vehicle is at an office location, there may frequently be a key-on time of 5:30 PM (when the user departs). But, if the same vehicle is at a home location, there may almost never be such a key-on time (since the user is already at home). Thus, key-on predictions may be made location-dependent if desired, which can improve accuracy. This also can avoid decaying predictions for an office location if, for example, the user is on vacation for two weeks and the vehicle is left at home.

The system can learn not only when, but where, key-ons occur, and if there is a deviation in key-on occurrence between locations, the data can be separated for a more refined prediction capability. For example, if a person sleeps at a significant other's house two nights a week, the key-on may still occur at 7 AM regardless of user location. Thus, the start times may not be broken out based on location, since 7 AM key-ons occur at both a home and significant other's location. On the other hand, if the user leaves home at 7 AM and the significant other's house at 6:30 AM (perhaps because of location), the start times could be broken out based on location. This would avoid predicting a vehicle start at 6:30 when the user was at home, and predicting a vehicle start at 7:00 AM (although the user would probably already be in the vehicle) when the user was at the alternative sleeping location. By using a low pass filter procedure, actual key-on times for each event do not need to be stored. A learned key-on map can provide the information, which is updated based on detected or non-detected events.

Figure 4:
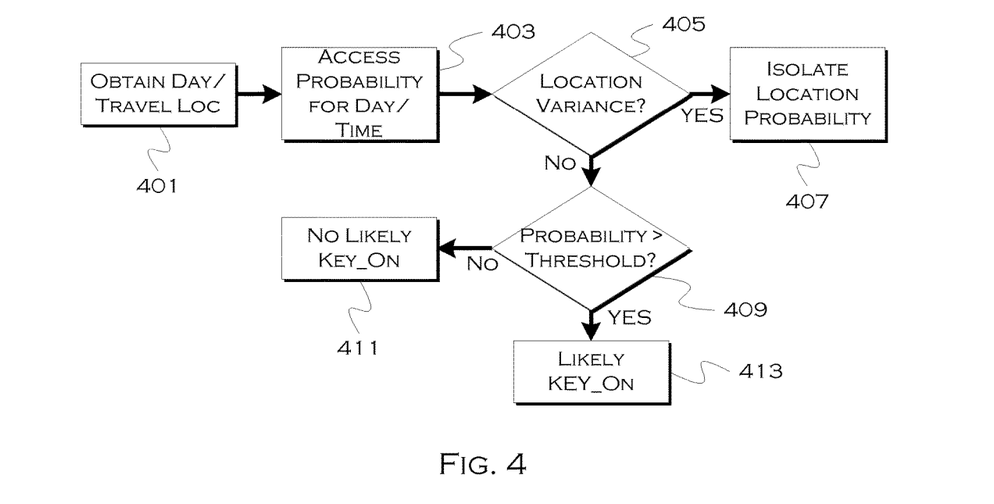

FIG. 4 shows an illustrative process for predicting upcoming key-on. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process attempts to determine whether a vehicle is about to be started. This process could run on a remote device or internally on a vehicle, if, for example, the vehicle had sufficient power to continually run such a process. When running on an external device, if a key-on was predicted, the process could communicate with the vehicle to instruct pre-conditioning.

In this example, the process examines a given time-window for a day and time interval 401. Also, in this example, a vehicle location is obtained (or a remote device location if the process is running on a mobile device, for example). A probability matrix or other predictive algorithm data source is accessed for the given time/day/location 403. This data is based on previously observed behavior for the day, time interval and/or location.

In this example, the process checks to see if there is a variance between data for the given location 405. That is, is there more than one key-on data set provided for a given time interval, representing differing probabilities of key-on based on different locations. If so, the process loads the appropriate data set based on the current location 407. There could also be a default to the most likely/unlikely set if a current location does not correspond to any locations associated with the various data sets (i.e., the vehicle is at a previously un-observed location).

The process then checks to determine if the probability of vehicle key-on is above a given tunable threshold 409. When there is little data available, the threshold may be set to a low probability, for example, because limited data may tend to make most probabilities close to 0. As data is developed, the probability can change. The probability may also be dynamically adjusted with respect to a temperature deviance from a baseline temperature (e.g., without limitation, a user's preferred vehicle temperature. That is, if the interior/exterior temperature is close to a preferred temperature, the likelihood of needing much preconditioning is low, so the threshold for prediction may be high, because even if the system is wrong, there is little impact to the user. On the other hand, if the temperature is 70 degrees below the preferred temperature, for example, the threshold may lower, so that more false positives may occur in the interest of capturing all the instances when the user is likely to use the vehicle, so that a very cold or very hot vehicle is not experienced. In other examples, the threshold is user tunable or OEM/dealer tunable.

If the probability is greater than the threshold 409, then the system predicts that the vehicle will be used within the examined time block, and the process returns a likelihood of key-on 413. This could be returned to a querying process, or, for example, an application running on a device remote from the vehicle could predict an upcoming key-on and communicate with the vehicle to predict needed/desired preconditioning. If the probability is lower than the threshold, the process may return a likelihood of no key-on 411, and return this value to a querying process or elect not to communicate with the vehicle, for example.

Figure 5A:
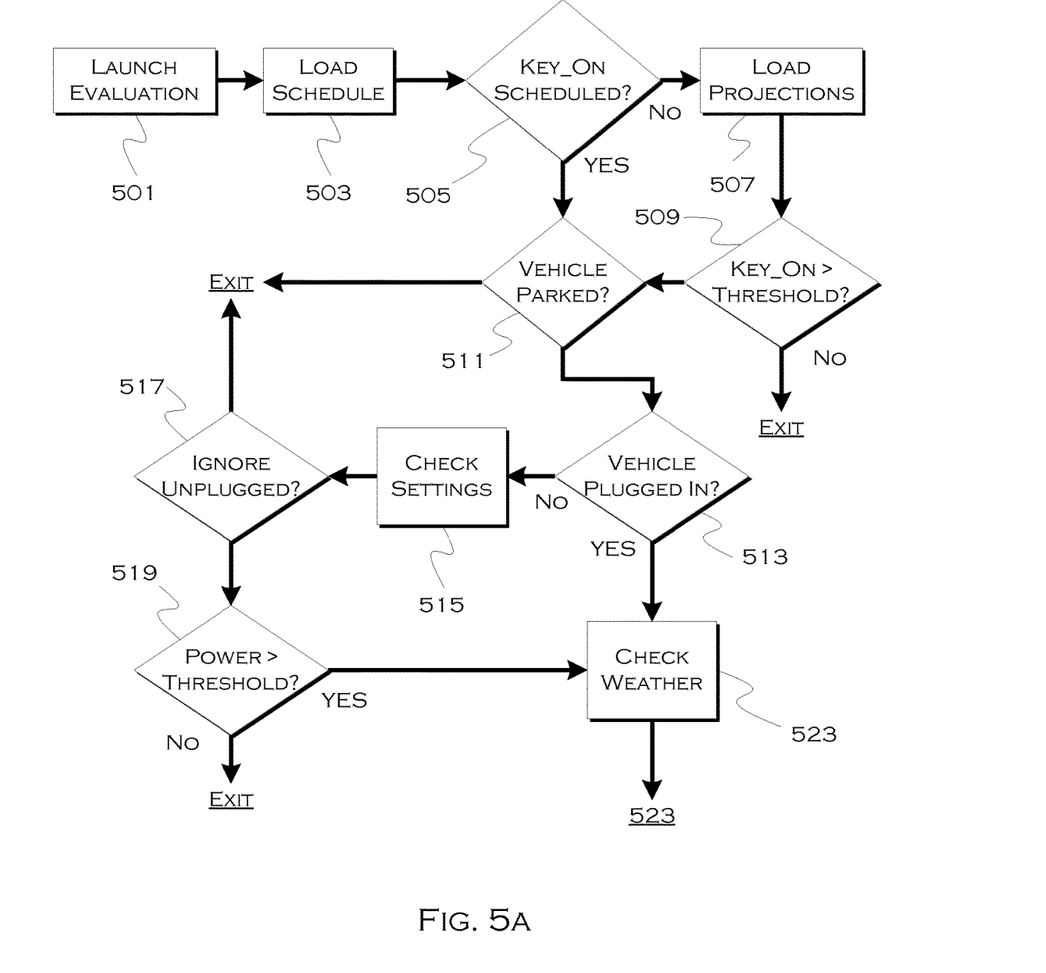
FIGS. 5A and 5B show an illustrative preconditioning process.
Figure 5B:
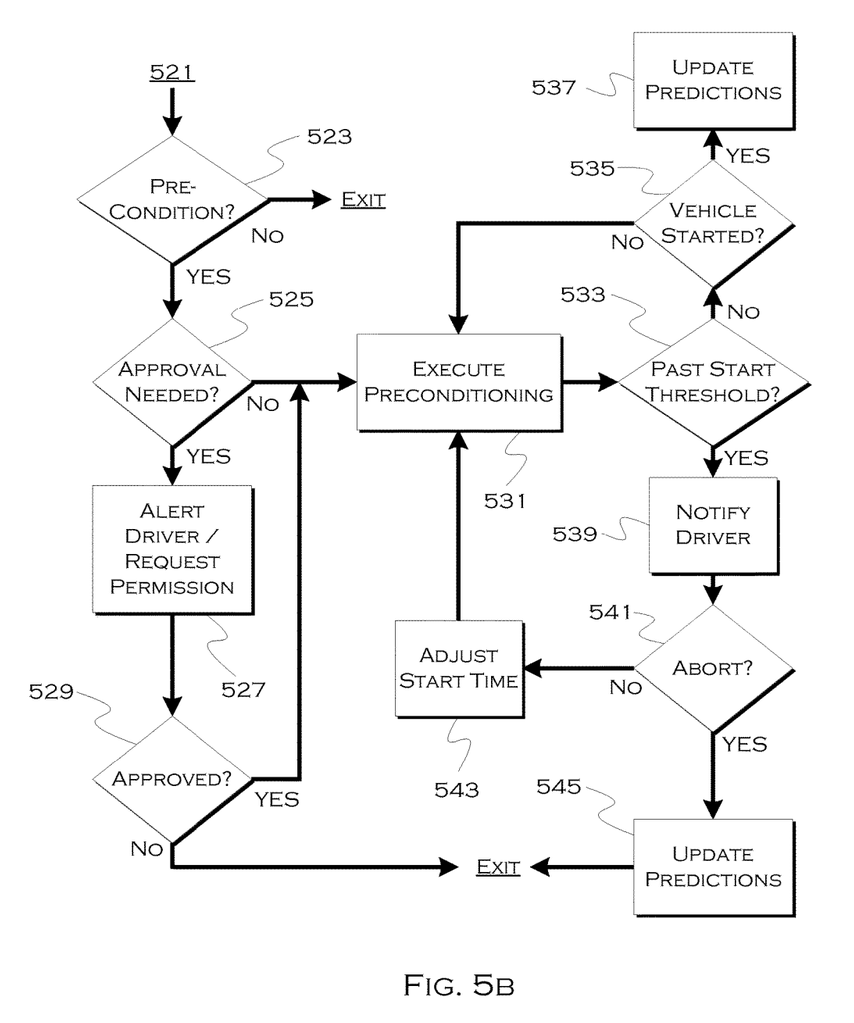

FIGS. 5A and 5B show an illustrative preconditioning process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a non-limiting process for preconditioning a vehicle is shown. First, in this example, the process begins by evaluating potential preconditioning needs 501. A user schedule, established by user input or by a series of user observations that have been codified into a schedule, is loaded 503. The user schedule will typically indicate known or commonly predicted key-on times, and can be periodically manually or automatically updated.

When the vehicle is being preconditioned, one or more preconditioning settings may be established for the user. These can be fixed settings (and/or defined by the driver), or can vary based on interior/exterior temperatures, time of day, weather, etc. For example, in the summer, (or when the exterior temperature is above 80 degrees), the user may want the vehicle cooled to 68 degrees. In the winter (or when the exterior temperature is below freezing), the user may want the vehicle heated to 74 degrees. If the exterior temperature is outside an optimal battery operating range, the battery may be heated or cooled to promote efficient use. If the weather is appropriate (i.e., no precipitation) and the settings permit, the vehicle windows may be slightly opened to permit heating/cooling assistance from exterior factors. For example, if a vehicle is sitting in the sun and the interior temperature is 130 degrees, it may take much longer to cool the vehicle, unless the windows can be opened to expel interior hot air. This may be acceptable if, for example, a vehicle is sitting in an owner's driveway.

If the schedule does not indicate an upcoming key-on (for a single or series of observed time intervals) 505, the process may load a prediction process, such as that shown in FIG. 4. If the prediction process predicts that a key-on is likely above a tunable threshold 509, the process will continue. Otherwise, the process exits. If the key-on is based on a driver input to the schedule, the likelihood may be considered as 100% likely, otherwise the likelihood may be based on aggregated observed behavior (e.g., without limitation, of the past X occurrences of the specified time interval, key-on has occurred Y times).

If there is a scheduled or highly likely upcoming key-on event, the process also makes sure the vehicle is not presently in use, by, in this example, ensuring the vehicle is parked 511. If the vehicle is in use, the process exits, because preconditioning is pointless while the vehicle is in use. If the vehicle is not in use, the process will check to see if the vehicle is plugged in 513. If the vehicle does not have an electrical connection to be plugged in, an alternative check for a certain threshold fuel level could be made, for example.

If the vehicle is not plugged in, the user may still desire preconditioning. In other examples, the preconditioning with respect to changing battery temperature may result in more efficient battery usage, so a check could be performed with respect to the settings for battery conditions. Other settings checks relate to other user preconditioning preferences 515. It may be the case that a user has set the settings to ignore an unplugged state 517, which is to say the user desires preconditioning even if the vehicle is unplugged. The same setting could be made for a threshold level of fuel. If the ignore unplugged/fuel level setting is set, the process may then check to see if the power/fuel is above a critical threshold 519.

The critical threshold and the "acceptable" threshold may vary with respect to fuel and power. For example, a user may wish to have preconditioning even if power is below 50% and the vehicle is unplugged, or fuel is below 50%. But, if fuel/power is below, for example, 20%, this may be deemed a critical level, and preconditioning will not occur. This prevents the user from coming outside to a warmed/cooled vehicle that is incapable of actual travel.

Also in this example, weather is checked 521. This could be as simple as taking an exterior or interior temperature, or could involve obtaining a prediction for upcoming weather as well. Since the preconditioning is largely concerned with preparing the vehicle to travel, the immediately local weather/temperature is of the most use in this situation. Further, since the interior, not the exterior, of the vehicle is being preconditioned, in most cases, the process may check the interior temperature as opposed to the exterior temperature, to determine if preconditioning is needed. In cases such as a defrost case, the process may utilize the exterior temperature as a basis for engaging a defrost mechanism. In other examples, the exterior temperature may be used as the basis for engaging preconditioning.

If the factors for preconditioning are met 523, the process may check to see if driver approval is needed to engage in preconditioning 527. In some instances, the driver may want to approve/decline any preconditioning attempts. Or, for example, if the preconditioning is based on a scheduled event, it may proceed without driver approval, but driver approval may be desired for predicted vehicle usages, since those may be more likely to produce false positives.

If driver approval is needed for the preconditioning, based on whatever approval settings are made, the process may alert the driver 527. If, for example, the process is executing on a mobile device (and possibly communicating with a vehicle to determine, for example, interior temperature, etc.), the process may alert the driver before instructing preconditioning, by using the mobile device. If the process is executing on a remote server or on the vehicle, the process may alert the driver through the mobile device or any other selected means of alert. If preconditioning is not needed, or is approved 529, the process may continue. A driver can configure the vehicle for automatic preconditioning or instruct the vehicle to confirm with a driver before certain or all preconditioning occurs. For example, if a vehicle needs limited pre-conditioning (i.e., the inside temperature is very near the desired temperature), the process may require confirmation, but, on the other hand, if the interior temperature rises above or falls below a threshold, the process may automatically engage preconditioning (if key-on is imminent).

Once preconditioning has been approved or if approval is not needed, the process may begin (or instruct initialization of) the preconditioning 531. Typically, the process will begin some tunable period of time prior to a vehicle projected start time. This may vary based on user settings, or, for example, may vary based on how significant a degree of preconditioning is needed (i.e., a small temperature change may require two-three minutes of preconditioning, whereas a large change may require ten to fifteen minutes). Since the efficiency of heating and cooling systems may diminish over time, the process could, if desired, track how long it takes to change from one temperature to another, and base the time period on the projected time to change the temperature to the desired temperature from the present temperature.

If the projected start time has not yet arrived 533, the process may check if the vehicle has been started 535. If the vehicle has been started, then an update may be made to any prediction process or data-log, indicating that the vehicle was started in a given interval 537. Otherwise, the conditioning continues.

If the projected time for starting has arrived (or a tunable threshold beyond the projected start time has arrived) 533, the process may notify the driver that the vehicle is preconditioning, but the vehicle has not yet been started 539. This gives the driver an opportunity to abort the preconditioning process 541, for example, if travel plans have changed. If the driver elects to abort the process, the system may negatively update a prediction relating to vehicle start, or negatively update a vehicle data store (usable in later analysis) 545. On the other hand, if the driver elects to continue preconditioning, the process may adjust the start time to a new projected start time (by incrementing the time by a fixed amount, receiving a new projected start time from the driver, etc.) 543 and continue the preconditioning.

Figure 6:
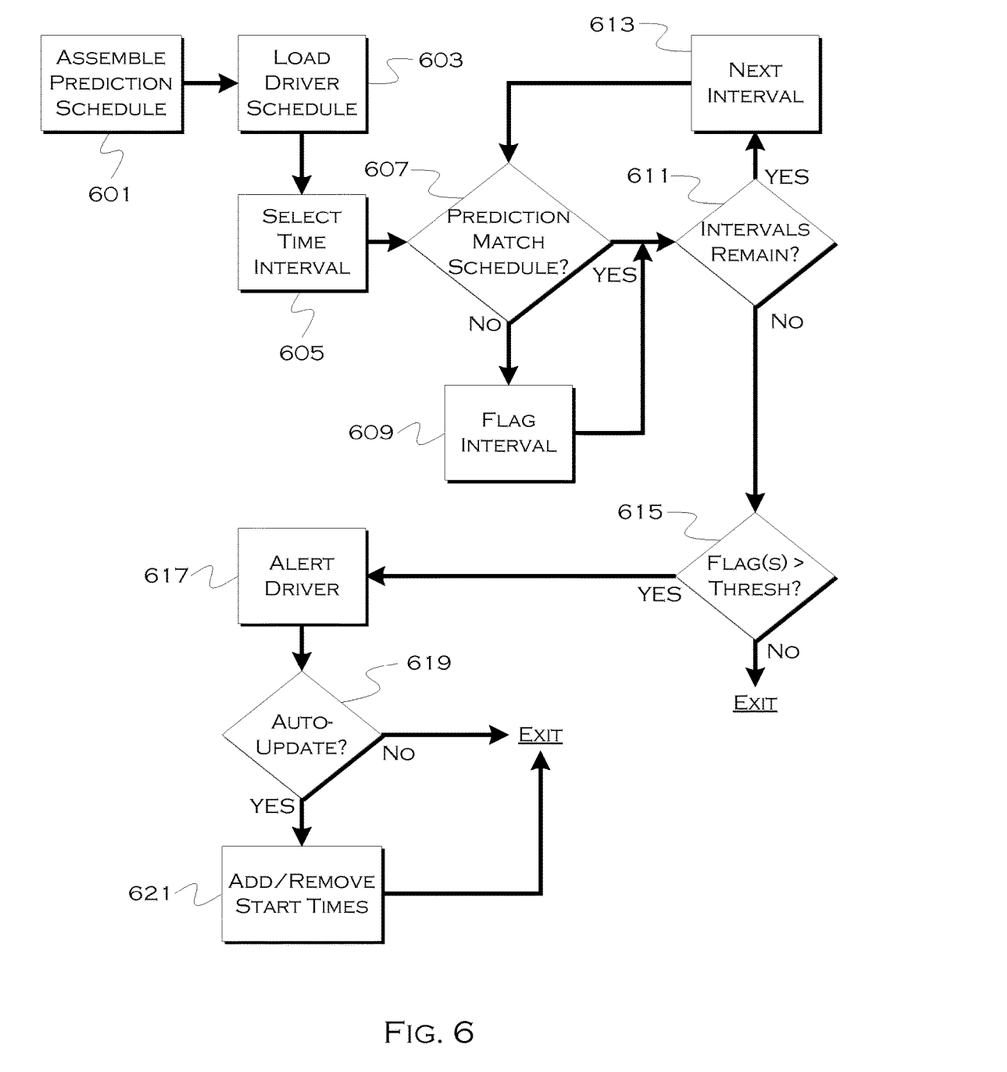
FIG. 6 shows an illustrative schedule update process.

FIG. 6 shows an illustrative schedule update process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, updates may be made to a driver schedule so that discrepancies observed over time with respect to projected vs. actual start times, or, for example, schedule start times that never actually occur, may be changed/removed on the schedule.

In this example, the process assembles a prediction schedule 601, based on when the vehicle is predicted to be started based on observed behavior. This schedule is generated based on the observed behavior of the driver, and is different from the existing, established actual schedule. The established schedule of scheduled start times can also be loaded at this time 603.

For an initial time interval (and for subsequent intervals), the process may compare the predicted key-on to a scheduled key-on to see if the scheduled data (yes or no to key-on) matches the predicted data 607. For each instance where the two schedules differ, the process may flag the time interval 609. This continues, by moving through next-intervals 613, until no intervals remain for consideration 611.

At this point in the process, when all appropriate intervals have been considered, the process determines if the number of flagged instances on the fixed calendar exceed a threshold 615. If automatic calendar updating is enabled, this step may be skipped, otherwise the step helps prevent a user from being bothered when there is a single or a simple few discrepancies. If there are a threshold number of discrepancies, in this example, the process notifies the user/driver 617. Automatic updating may also skip the notification step, and simply modify the fixed calendar based on predictions with a high degree of success. In this example, the driver may elect to have the fixed calendar automatically updated 619 to accommodate the new times indicated by the flags (and to remove inaccurate currently scheduled times) 621, or, the driver may instead log into a service or access an application that permits manual editing of the schedule.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a processor configured to:
   access a schedule of likely vehicle start times;
   select a scheduled key-on time from the schedule, having a likelihood of occurrence, based on observed vehicle usage, above a tunable threshold, when a current time is within a tunable proximity to the scheduled key-on time and;
   determine if a present vehicle-related temperature warrants vehicle preconditioning; and
   precondition the vehicle until preset preconditioning settings are established.

2. The system of claim 1, wherein the vehicle-related temperature includes a vehicle interior temperature.

3. The system of claim 1, wherein the vehicle-related temperature includes a vehicle exterior temperature.

4. The system of claim 1, wherein the preconditioning includes heating or cooling the vehicle interior.

5. The system of claim 1, wherein the preconditioning includes engaging a vehicle window defrost.

6. The system of claim 1, wherein the preconditioning includes heating or cooling a vehicle battery.

7. The system of claim 1, wherein the processor is further configured to:
   notify a user to request approval to continue preconditioning if a projected key-on time has passed.

8. The system of claim 7, wherein the processor is further configured to:
   set a new projected key-on time if a driver instructs continued preconditioning.

9. The system of claim 1, wherein the schedule includes vehicle start times based on driver input into a schedule, which are treated as having a 100% likelihood of occurrence.

* * * * *